US006933014B1

(12) United States Patent
Wynne

(10) Patent No.: US 6,933,014 B1
(45) Date of Patent: Aug. 23, 2005

(54) PEELABLE STENCILING INK AND METHOD OF USING

(76) Inventor: John H. Wynne, 8009 Bynum St., Long Beach, CA (US) 90808

(*) Notice: Subject to any disclaimer, the term of this patent is extended or adjusted under 35 U.S.C. 154(b) by 309 days.

(21) Appl. No.: 10/092,245

(22) Filed: Mar. 6, 2002

(51) Int. Cl.[7] .................................................. B05D 1/32
(52) U.S. Cl. ....................... 427/272; 427/282; 427/300
(58) Field of Search ................................ 427/272, 282, 427/300, 154, 155; 106/31.01, 31.13, 31.27, 106/31.28, 31.6, 31.9; 101/129

(56) References Cited

U.S. PATENT DOCUMENTS

| | | | | |
|---|---|---|---|---|
| 1,605,041 A * | 11/1926 | Kritchevsky et al. | ......... | 106/10 |
| 3,830,626 A * | 8/1974 | Rosenberger et al. | .......... | 8/485 |
| 3,928,677 A * | 12/1975 | Anthony | ...................... | 44/519 |
| 4,129,669 A * | 12/1978 | Lopez | ........................ | 427/282 |
| 4,717,390 A * | 1/1988 | Dien | ............................. | 8/436 |
| 5,967,031 A * | 10/1999 | Gauss | ........................ | 101/129 |

FOREIGN PATENT DOCUMENTS

JP 60-26039 A * 2/1985 ............. C08J 7/00

OTHER PUBLICATIONS

Definition of "plastic" from Hawley's Condensed Chemical Dictionary, 12th Ed., (c) 1993 by Van Nostrand Reinhold, pp. 922 923.*

Definition of "adhesive, rubber-based" from Hawley's Condensed Dictionary, 12th Ed., (c) 1993 by Van Nostrand Reinhold, p. 24.*

* cited by examiner

*Primary Examiner*—Timothy Meeks
*Assistant Examiner*—William Phillip Fletcher, III
(74) *Attorney, Agent, or Firm*—William L. Chapin

(57) ABSTRACT

A peelable stenciling ink for imprinting indicia such as letters, numbers and symbols on a surface of an article such as a sport ball made of leather or a synthetic polymer, e.g., a thermoplastic material, consists of a solvent, a dye dispersed in the solvent, and a film-forming polymer soluble in the dye-solvent solution to form a thick paste and hardenable into a solid, flexible film upon evaporation of the solvent from a thin layer of ink applied to an article surface. A method of using the ink comprises the steps of temporarily adhering a stencil sheet in fluid-tight contact to an article surface by a pressure-sensitive adhesive layer, smearing a layer of the ink on the obverse surface area of the stencil sheet through indicia-shaped openings through the sheet onto the article surface, allowing sufficient time for dye in the ink to penetrate the article surface, and for the solvent to evaporate and cause the film-forming substance to harden into a solid film peelable from the article surface, and peeling the stencil sheet and solid film together from the article surface, thereby leaving indicia markings imprinted on and dye-penetrated beneath the article surface, thus making the markings resistant to obliteration by scuffing or abrasion.

43 Claims, 2 Drawing Sheets

PEELABLE STENCILING INK AND METHOD OF USING

BACKGROUND OF THE INVENTION

1. Field of the Invention

This invention relates to the field of stenciling. More particularly, the invention relates to a novel peelable penetrating ink and a method of using the ink to stencil objects such as fielding gloves, balls, and other sporting goods made of leather or synthetic polymers.

2. Description of Background Art

The permanent marking of a name or other identifying characters on personal possessions has long been considered a prudent practice to prevent loss and discourage theft of one's belongings. The possibility of loss or theft is increased for obvious reasons, when articles are taken out of the home and shared with others. For this reason, sporting goods and accessories such as balls, sport bags, jerseys, football helmets, baseball gloves, etc. are frequently marked with identifying names, numbers or characters. Common lettering or imprinting methods are often employed commercially to put names, numbers, or other identifying characters on these articles. Such methods include embroidery, silkscreen, printing, hot melt lettering, etching, etc. Commercial imprinting methods however, generally use expensive machinery which requires skill to operate, set up time, etc; and therefore require a certain minimum volume of work to be cost effective. Such methods are therefore, not economically practical solutions for individuals' personal identification needs. In addition, typical commercial imprinting methods have limitations in that they are designed to work on flat and generally smooth regular surfaces. Items which are spherical or irregular in size and shape such as sport balls and baseball fielding gloves therefore, present problems for such imprinting methods. Athletic balls, including basketballs and playground balls, present additional problems for some of these methods since they are air-filled and cannot tolerate the high temperatures required for some imprinting methods.

Baseball fielding gloves and particularly athletic and sport balls such as basketballs have additional problems for identification since they are used under circumstances where their surfaces are subject to abrasive forces. Sport balls such as basketballs, playground balls, and even soccer balls and footballs, are often used repetitively on abrasive surfaces such as asphalt or concrete. Under such use any surface identification markings are quite rapidly abraded or removed.

A common marking technique used by individuals is the free-hand application of ink or dye to an article's surface, using felt tip markers, ball point pens or other such marking devices or instruments. This freehand identification technique, while convenient and easy to use, has many drawbacks. The results, however expedient, oftentimes appear almost as a defacement of the article in contrast to the existing professional lettering and graphics imprinted on the article by the manufacturer. In addition, felt tip or ballpoint pen marking devices are designed to apply the ink very thinly. A rapidly evaporating solvent carrier is also usually employed in such inks to restrict dripping or running of the ink medium which would ruin the lettering effect. Consequently, only the article's surface is marked and little or no penetration of colorant beneath the article's surface takes place. Any identifying marks placed on a ball or glove, for example, could be easily worn off with repeated use and would have to be reapplied. Also, any such surface marks could be easily abraded and removed with sandpaper or perhaps washed off with a solvent by someone intent on theft. Articles manufactured from natural leather allow more penetration of colorants due to the leather's porosity as opposed to articles manufactured from synthetic leather, synthetic rubber, and various proprietary plastic polymers. Articles made from such synthetic, generally thermoplastic, materials, which are usually much more resistant to the penetration of dyes or colorants than leather, are thus more difficult to mark permanently.

It has been demonstrated in many early prior art patents, such as, for example, U.S. Pat. No. 2,260,543 to Smith and U.S. Pat. No. 3,830,626 to Rosenberger et al. that various thermoplastic articles composed of materials such PVC can be penetrated with a dye at ambient temperatures for the purpose of applying a uniform coloration or a variegated coloration to produce an aesthetic contrast, below the article's surface. Such coloration methods have been accomplished by combining the dye with a solvent and allowing the dye to dissolve into the plasticizer of the article. Many other methods have been developed that enable plastic surfaces to be dye-penetrated with characters or other identifying marks. U.S. Pat. No. 3,519,466 to Akamatsu, U.S. Pat. No. 4,668,239 to Durand and U.S. Pat. No. 4,820,310 to Fukui are examples. These methods render an effective abrasion resistance to the articles marked; however, the methods generally require that the thermoplastic articles be heated close to their melting points. Dyes are then allowed to diffuse or sublimate into the heat softened article. The processes also usually require the article to be washed, to remove any dye additive, and then dried. Since prior art techniques usually require high temperatures near the melting point of the article material, along with washing and drying steps, the techniques are generally more suitable for commercial or industrial applications and are rather impractical for individual use.

Stencilling has been proven to be a versatile, quick, and time-proven method for individuals to achieve accurate and consistent lettering or character representations on a wide variety of surfaces and objects. The technique consists essentially of applying a surface coating of paints or inks through appropriately shaped perforations in a stencil sheet onto personal articles such as sport bags and clothing. Stencilling is a well known expedient, and individual stencilling kits to perform such tasks have also been developed. However, the present inventor is unaware of stencilling materials or methods useable by an individual to produce subsurface markings or dye penetration on a variety of textured objects such as sports balls and gloves made of various materials, including natural and synthetic leathers.

U.S. Pat. No. 4,316,766 to Levin describes unconventional stencils where the stencil openings are formed by a multitude of small perforations formed by an electrostatic process. This process appears to be designed primarily for the chemical etching of glass surfaces. The inventor implies that this method could also be used with solvent based marking systems. The perforation type openings described, however, could not allow the amount of dye and solvent, found necessary in experiments performed by the present inventor, to effect subsurface penetration to any appreciable depth. The process disclosed in Levin, if adapted for dyeing, would also have the disadvantage of requiring the surface to be washed of excess dye and thickener.

In order to effect subsurface dyeing with stencils, the present inventor has found it necessary to first saturate a surface with a sufficient amount of dye and solvent mixture and allow the mixture to persist on a surface for a period of time. The stencilling art, however, has traditionally admonished against such a practice, teaching that colorants must be applied very dryly or sparingly to avoid seepage under the stencils. Indeed, special stencilling brushes have been developed towards this end.

Stencils used in dyeing are used primarily in conjunction with silkscreen processes, where dyes are used mainly on fabrics. In these processes, it is first necessary to add a thickening agent to the thin, watery dye mixture so that the dye solution will not run under the stencil opening and ruin the image. Common thickening agents include such substances as wheat paste, cornstarch and agar, which are made of fine particulate or colloidal material. When using these agents, initial and periodic agitation of the solution is generally necessary to keep the particles suspended so that the desired consistency of the dye mixture is maintained. Dye solutions not properly or frequently agitated can yield too watery a dye mixture by allowing the colloidal particles to settle to the bottom. The thickened mixture is generally allowed to dry and the article is washed to remove the excess dye and thickeners.

Dyeing with conventional stencils using dye mixtures thickened according to the above described silkscreen methods has been tested by the present inventor with some success. Some penetration of thermoplastic articles at ambient temperatures has been achieved to some degree in these tests. In the tests a thickened dye mixture was applied to a surface through the stencil openings and allowed to dry. The stencil was next removed and the surface washed with a suitable solvent to remove the excess dye and thickener. The article was then dried. This additional washing and drying process was found to be time consuming and carried the risk of spreading the excess dye on the intended object, one's clothes. hands, etc. This risk of spreading the dye becomes an even greater problem when using organic solvents and permanent penetrating dyes, which are necessary to cause subsurface markings.

Dyeing with stencils perhaps offers the individual a potential alternative to the many available commercial and industrial lettering methods. However, because of the above-described drawbacks, dyeing with stencils has not proven to be a reliable solution to the existing dye identification problem. There thus remains a need for a convenient way for an individual to effectively stencil or apply a deeply dyed or penetrative identification to a variety of objects including athletic balls and fielding gloves.

OBJECTS OF THE INVENTION

An object of the present invention is to provide a novel stenciling ink and method that enables a surface of an object to be penetrated with dye contained in the ink, yet requires no washing or drying steps.

Another object of the invention is to provide a novel stenciling ink and method that enables a surface of an article to be penetrated with dye contained in the ink, yet requires no heating step.

Another object of the invention is to provide a novel stenciling ink and method in which identification markings can be easily imprinted on the surface of an object, the markings penetrating beneath the surface to thereby impart an abrasion and wear resistance to those markings.

Another object of the invention is to provide a novel stenciling ink and method including a dye thickener which is a dissolved film-forming substance and therefore does not require initial or frequent mixing to give consistent results.

Another object of the invention is to provide a novel stenciling ink and method which includes a dye thickener comprising a dissolved polymer or film-former that forms a solid film which is peelable from an object surface in a solid film state along with a stencil.

Another object of the invention is to provide a novel dye-stenciling ink and method including a dye thickener that forms a solid film which may be peeled off an object surface without requiring a washing step, making it unnecessary for the article to be dried, thus greatly simplifying the dye stenciling process.

Another object of the invention is to provide an article stenciled and penetrated with a dye, in a clearly defined pattern, in which a dried dye thickener and dye remnants are adhered to a stencil and removed in unison, with the removal of the stencil, thereby obviating heretofore-required washing and drying steps.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of our exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

According to the present invention, a novel peelable stenciling ink and method for stenciling indicia onto the surfaces of articles which are composed of a wide variety of materials, such as leather and thermoplastics, is disclosed which comprises: (1) preparing a peelable stenciling ink comprising (a) at least one dye or organic colorant, (b) at least one solvent for said dye, the dye solvent solution having properties enabling it to penetrate the surface of an article, and (c) a film forming polymer which is soluble within the solvent dye solution in sufficient amounts so that a suitable thickener for the dye stenciling mixture is formed and whereby upon substantial evaporation of the dye solvent, a solid film is formed which releasably contacts an article's surface; (2) securing to the surface of an article, one or more thin stencil plates or sheets bearing alphanumeric characters or other symbolic indicia in the form of cutout areas or openings through the sheet, preferably by means of pressure sensitive adhesive on a reverse side of the sheet; (3) applying the described ink to the obverse side of the stencil sheet and through the open areas of the sheet onto the article's surface, the applied ink extending a distance beyond the open areas onto adjacent areas of the stencil sheet; (4) allowing sufficient time for the solvent of the ink to evaporate and thereby form a pliable, solid film, and (5) peeling the stencil sheet from the article's surface and with it the solid film and excess dye bound therein, leaving the article's surface penetrated in the form defined by the stencil perforations and requiring no washing or drying steps.

DESCRIPTION OF THE PREFERRED EMBODIMENTS

Reference Numerals in Drawings

Figure 1:
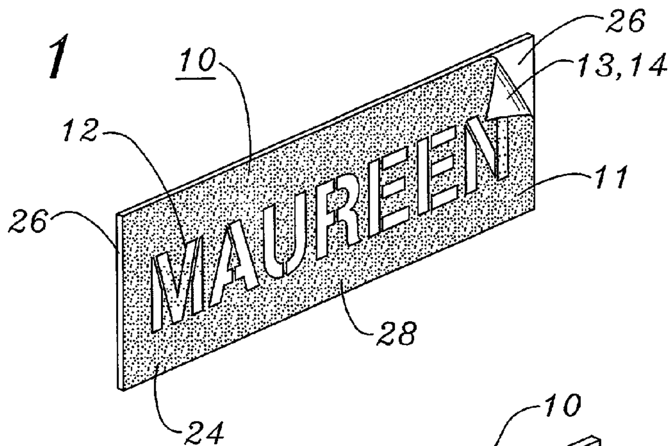
FIG. 1 is a perspective view of a stencil sheet made of flexible material for use with a peelable stenciling ink and stenciling method according to the present invention.

- 10 stencil sheet
- 11 front surface of stencil sheet
- 12 openings through stencil sheet
- 13 rear surface of stencil sheet
- 14 pressure sensitive adhesive
- 16 surface of object to be stenciled
- 17 object to be stenciled
- 18 stenciling ink
- 20 solid film remnant
- 22 dye-stenciled characters
- 24 edge of stencil sheet
- 26 release liner
- 28 planar region of stencil sheet FIGS. 1 through 5 illustrate a novel method of stenciling using a novel peelable stenciling ink according to the present invention. Referring first to FIG. 1, a stencil 10 is shown which is made conveniently from stencil sheeting material, such as a thin film, foil, paper product, or other suitable material which is substantially impermeable to a novel peelable stenciling ink described below. Perforations or openings 12 having the shapes of alphanumeric or other symbolic indicia are provided through the stencil. Openings 12 are located substantially intermediate the edges 24 of stencil sheet 10. A planar region 28 of stencil sheet 10 substantially surrounds openings 12. Planar region 28 is that area of the stencil's surface not occupied by the openings. Although a single stencil is shown herein by way of example, separate or individual stencils bearing characters or symbols can also be used and linked together by various means.

To hold the rear surface 13 of stencil sheet 10 in fluid-tight contact with a surface 16 of an object 17 to be stenciled, the rear surface of the stencil sheet preferably has adhered thereto an adhesive layer 14 consisting of a pressure sensitive adhesive which has attached thereto a protective suitable release liner 26 or backing. Suitable pressure sensitive adhesives for layer 14 for use in the present invention include those known in the art which are compatible with the selected release liner as well as the intended surface to be dyed and stenciled. In addition, the adhesive should be selected so that it provides sufficient adhesion of the stencil to the selected surface to form a fluid-tight seal therewith, yet be strippable from the surface to enable the stencil's ultimate release from the surface. Various pressure sensitive adhesives such as rubber based adhesives, as well as acrylic and emulsion acrylic based pressure sensitive adhesives, can be used successfully provided that they are compatible with the chosen release liner and selected surface to be dyed. The type of adhesive selected for use in this process is not considered critical to the function of this invention.

Figure 2:
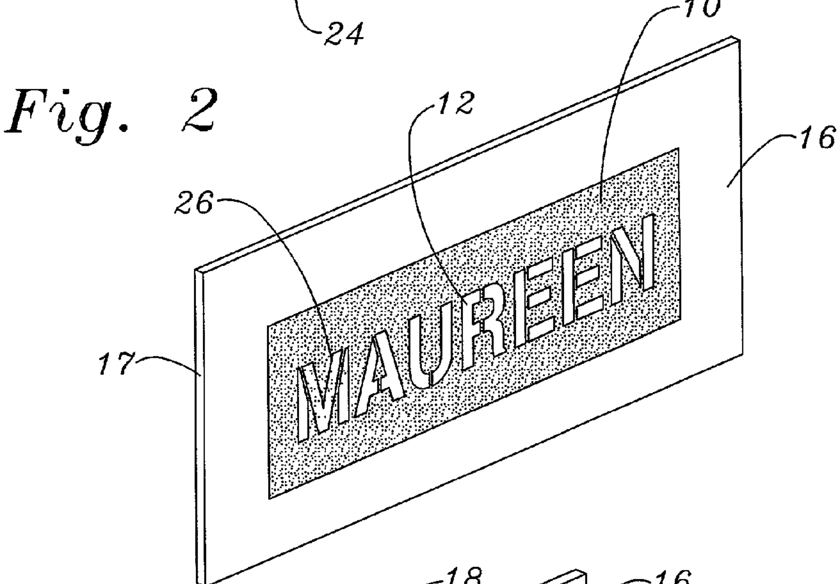
FIG. 2 is a perspective view of the stencil sheet of FIG. 1 applied to a surface of an object to be stenciled.
Figure 3:
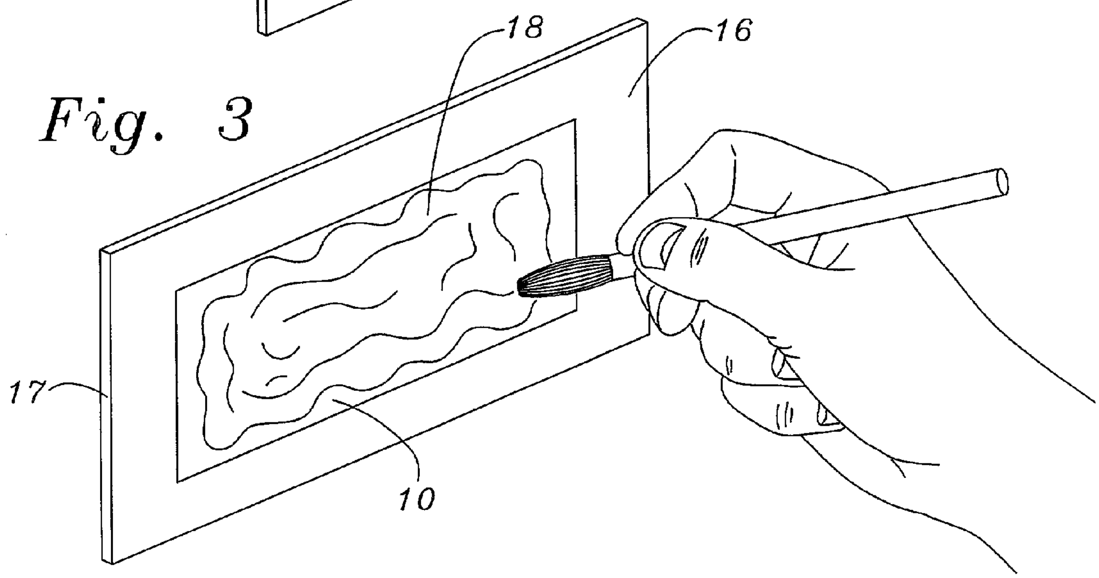
FIG. 3 is a perspective view of a step in performing the method of the invention, showing a novel peelable stenciling ink applied to an object surface through cutouts or openings through the stencil sheet.
Figure 4:
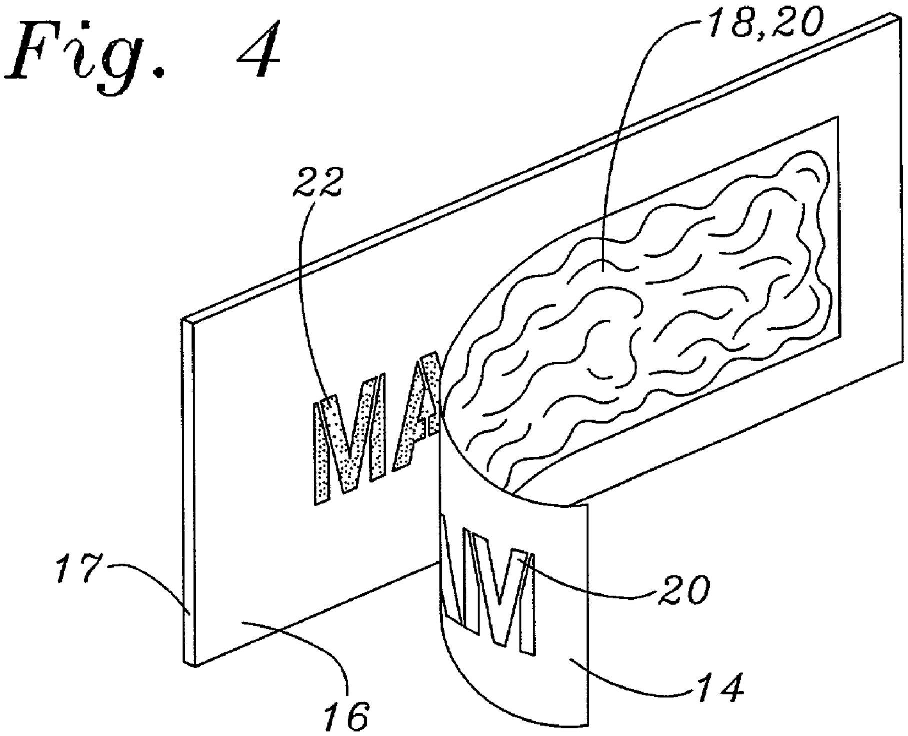
FIG. 4 is a perspective view showing the stencil sheet and hardened ink being peeled away from the object surface.
Figure 5:
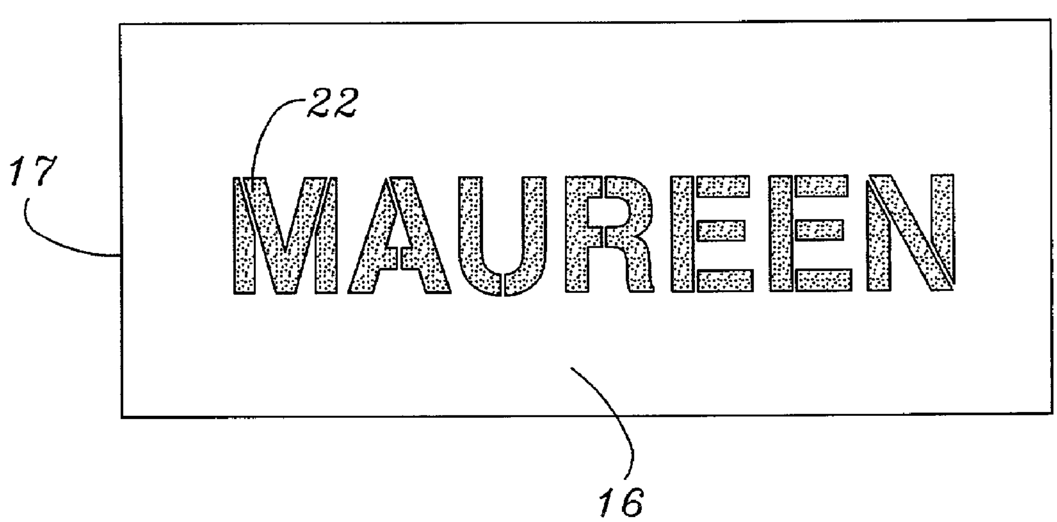
FIG. 5 is a perspective view showing characters dye-stenciled onto the object surface.

FIG. 2 shows a selected surface 16 of an object intended to be dyed, with the stencil attached by means of pressure sensitive adhesive layer 14, or other suitable means. A novel liquid stenciling ink 18 is shown being applied in FIG. 3 to surface 16 through openings in stencil sheet 10. FIG. 4 shows stencil sheet 10 partially peeled away from object surface 16, and with it a dried solid film remnant 20, leaving a distinct characters 22 dye-penetrated into the surface. FIG. 5 shows characters dye-stenciled into object surface 16.

The stenciling method of the present invention is similar to that of conventional stenciling methods, however the novel results obtained are quite surprising. The stencil is temporarily secured in fluid-tight contact to a selected surface, preferably by means of an appropriate pressure sensitive adhesive. Slight finger pressure is exerted over the entire surface of the stencil to insure sufficient adhesion to the surface. The novel peelable stenciling ink is then applied with a convenient applicator such as a brush, rod, spatula, or roller so that the ink covers the openings of the stencil while also covering a portion of planar areas 28 bordering each stencil opening 12. The stencil ink is applied thickly and generously, as in the conventional manner, so that an adequate amount of dye and solvent is available to penetrate an object surface. The stencil ink is adequately thickened to a paste-like consistency, preventing the dye from spreading laterally underneath the stencil openings. The stencil ink is also applied thickly and generously so that, upon evaporation of the solvent, a flexible solid film is formed of sufficient thickness to enable it to be peeled away in its entirety from an object surface when the stencil sheet is lifted off the article. The borders of stencil openings serve as physical boundaries to help contain the dye mixture, while the stencil itself removes the dried film remnant when the stencil, with the attached dried film remnant, is lifted off the surface of the object.

In accordance with the specific practice of the invention as discussed above, the stenciling ink is first prepared by appropriately mixing or otherwise physically combining at least one dye, at least one solvent and at least one film-forming polymer. Since a wide variety of thermoplastic as well as leather articles are contemplated as suitable subjects for this novel dye stenciling process, the dyes, solvents, and polymers selected for use, as one would expect, will also be quite varied.

In preparing a novel peelable stenciling ink according to the present invention, a penetrating dye is preferably first selected and dissolved in a suitable or compatible solvent so that the surface of a desired article can be dyed and sufficiently dye-penetrated. The specific dye and solvent combination employed will, of course, depend upon the specific properties of the various materials to be dyed, typically including a wide variety of thermoplastic and leather articles. It has been found desirable, when dyeing synthetic resin or thermoplastic articles, to choose a solvent that is known to be able to dissolve or at least swell the article's surface. The selection of solvent can be facilitated through actual testing of materials with various known solvents. Alternately, one can consult resin or thermoplastic solubility tables that are available from various sources. Union Carbide Chemicals and Plastics Company Inc. is one such reliable source. Their UCAR® Performance Solvents Selection Guide for Coatings includes tables showing the solubility characteristics of common synthetic resins and polymers with a wide range of organic solvents. It would not be practical to reproduce all of these materials here but they are available from Union Carbide upon request.

The selection of a dye and solvent combination to effect subsurface dyeing on any particular article, while being a critical step in this invention, does not relate to the essence of the invention. Furthermore, the dye and solvent selection process and the process for selecting and determining dyes and solvents for use on various materials are a widely known and a well developed science and art. There are numerous references available which include tables of exemplary dyes and compatible solvents that can be consulted and wherein testing procedures, methodology and other recommendations are set forth suggesting how dyes and solvents can be selected to enable the dyeing of various materials.

Consequently, as one can imagine, the numerous dyes and solvent combinations, which are available for such a wide variety of applications, make it highly impractical to set forth a comprehensive list. In addition, it is not considered necessary to list in this specification all of the various dyes and compatible solvents which may be used for the purpose of the invention herein described inasmuch as such dyes and solvents and combinations thereof are well known in the art. Such dyes and appropriate solvents for the dyes are discussed in a number of authorities. For a comprehensive list of available dyes, reference can be made to the Chemistry of Synthetic Dyes and Pigments by H. A. Lubs, Reinhold Publishing Corp., 1965.

Since there are a wide variety of materials which can be dye-stenciled using the method of the present invention, a broad array of dyes are available for consideration and possible use by the practitioner. Single dyes or a combination of different dyes may be used to give a variety of shades and colors to the articles treated. Representative classes of dyes based on chemical structure, which may be cited, include: azo, monoazo, trisazo, polyazo, diazo, disazo, azoic, stilbene, diphenylmethane, triarylmethane, acridine, azine, ketone imine, methane, nitro, nitroso, oxazine, thiazine, sulphur, lactone, indigoid, quinoline, methine, thiazole, indamine, xanthene, phthalocyanine, and anthraquinone. Also, representative classes of dyes by method and area of application which may be cited include: acid, mordant, natural dyes, food, leather, direct, reactive, solvent, pigment, basic, spirit oil, vat and disperse dyes. Because of the numerous dyes that are commercially available and readily accessible, it would be highly impractical therefore to set forth a comprehensive list. However, in order to facilitate practice of the invention by those skilled in the art, specific examples of suitable dyes will be provided in the examples section of this disclosure.

Solvents that may be suitable for use in a peelable dye stenciling ink of the present invention, as one might expect, include solvents from a wide variety of classes or major groups including but not limited to alcohols, hydrocarbons including chlorinated and aromatic hydrocarbons, esters, ethers, ketones, nitroparaffins, miscellaneous solvents as well as water. Furthermore the solvents suitable for selection will vary quite widely in physical properties such as evaporation rates.

Some specific examples of solvents are ethanol, n-butanol, methanol, propanol, isopropanol, iso-butanol, amyl alcohol, benzyl alcohol, hexone, cyclohexanone, methyl cyclohexanone, methyl ethyl ketone, methyl isobutyl ketone, acetone, benzene, chloroform, methylene chloride, carbon tetrachloride, ethylene dichloride, n-butyl acetate, ethyl acetate, propyl acetate, isopropyl acetate, amyl acetate, methyl cellosolve acetate, cellosolve acetate, benzyl acetate, methyl formate, ethyl formate, ethyl lactate, butyl lactate, ethylene glycol monoethyl ether, ethyl ether, methyl cellosolve, cellosolve, butyl cellosolve, toluene, xylene, tetralin, dioxane, pine oil, and various mixtures of the above. It is, of course, understood that other solvents may be employed and that the foregoing compounds are merely exemplary. The specific solvent employed will naturally depend on the solvent requirements of the selected dye and substrates as well as the requirements of the selected polymer film former. It should be further understood, that more than one solvent may be blended to increase the solubility of one or more dyes in a solvent system and for other reasons. It is obviously necessary that any solvent or solvent system employed contain solvents, which are compatible with one another so as to be mutually soluble, if the benefits of using a plurality of solvents are to be achieved.

The dye and solvent combination then, are selected depending upon the specific material of the article chosen to be dye penetrated and stenciled. The choice of dyes, as well as dye combinations will, of course, also depend on the coloration or shades of colors desired. Ideally, the specific solvent-dye solution chosen should have enough penetrating action to permit the dye to extend, to some degree at least, into the interior of the article so as to effect dye impregnation. The combination of dye and solvent should also be chosen to provide the desired shade of colorant or the minimum depth of required dye penetration.

The dye and compatible solvents usually can be selected among known or suggested proven commercial solutions. There are usually a variety of dye and solvent combinations that are suitable for any specific application. However, since the mechanism of dye penetration or dye diffusion into polymers and even leathers can be unpredictable and is not fully understood, some experimentation may be required in order to determine the optimum dye and solvent combination for a specific application. Those skilled in the art will understand and appreciate the value of this experimentation.

A preferred method of testing can be simply done by initially dissolving the chosen dye into the selected solvent. The dyes are generally in the form of powders and are combined with the solvent usually in amounts of 2 percent to 8 percent dye by weight to the stenciling mixture. A suitable amount of this dye and solvent mixture is then applied to a small portion of the article's surface with a sponge, cloth, cotton swab, or other such convenient applicator. The mixture is allowed to persist for some time, usually until the solvent has evaporated. A knife's edge, file or some other type instrument is then applied to the article with a scraping or abrasive action so as to expose the article's subsurface showing the degree of dye penetration, if any. Those skilled in the art will, upon observation of the results, readily adjust the method or select other suitable dyes and solvents, if necessary, according to their specific requirements. Generally, if the article can be dye-penetrated as described in this testing procedure, it can be dye-stenciled according to the present invention. One can then proceed in carrying out the method of this invention by selecting an appropriate film-forming polymer to be added to the solvent-dye solution. However, in some cases, after testing it will become apparent that certain materials will be impervious to the selected dyes and solvents and will not be able to be dyed at ambient temperatures according to the inventive process of this invention.

There are a number of thermoplastic materials in the above category, which are resistant to being dyed at ambient temperatures. This resistance to dying by the thermoplastic material can often be a basic inherent property of the material itself. Indeed, many thermoplastic or synthetic resin materials are chemically formulated to be solvent and stain resistant. These chemically resistant materials are usually, by design, highly impervious to the most aggressive solvents and dyes. Many of these dye and solvent impervious polymers are well known and such described properties are usually specifically disclosed in the manufacturer's product and technical data sheets.

The exact mechanism of penetration or diffusion into various substrates by the mixture formulated by the above method is not always understood or precisely known; nor is the subsequent bonding or attachment mechanisms of dye to any given substrate.

There are detailed works describing the known methods of dye attachment or dye absorption to materials and the application of physical chemistry has been very useful in understanding these processes. While it is beyond the scope or purpose of this disclosure to attempt to delve into this type of detailed explanation, it will be mentioned that there are at least four kinds of forces at work: Ionic forces, hydrogen bonds, covalent linkages and Van der Waals' forces. For examples and explanation of these forces, reference can be made to Dyes and their Intermediates by E. N. Abrahart, Chemical Publishing, New York, 1972.

An understanding of the specific mechanism of dye and/or solvent penetration into a selected substrate material may perhaps be helpful or beneficial in the process of selecting the appropriate dye or solvent for a particular application. However, such an understanding is not a prerequisite or a requirement of the process of this invention, for ultimately one has to rely on some experimentation.

The depth of penetration of the dyes appears to be governed by standard principles known to those skilled in the art. Some of the known principle factors determining dye penetration are: the solvents dissolving or penetrating action on the substrate; the ability of the specific dye to be carried into the material by the solvent; the amount of solvent and dye in contact with the substrate; the time the solvent and dye are in contact with the substrate; and the temperature of the various components.

Although penetrative dye and solvents are required in both leather and thermoplastic articles, the porosity of leather appears to be a governing factor in enabling leather to be dyed by a very broad range of dye and solvent combinations. Indeed, both water and organic solvents combined with compatible dyes have been used successfully in dye processes with leather. There is believed to be, however, a number of different mechanisms or theories involved in the penetration of dye into thermoplastic materials. It is known, for example, that certain strong solvents can swell or partially dissolve certain thermoplastic materials to the extent that dyes can readily diffuse into their substance. The dyes can then bond or otherwise attach to the material beneath the article's surface. Indeed the choice of a solvent that will swell or partially dissolve the thermoplastic has been proven to be a good starting point for the selection of solvents. It has also been postulated that certain dyes can be carried below the surface of a thermoplastic article by attaching to the plasticizers in the article.

According to the present invention, once a solvent and dye combination have been selected using the recommended or known testing procedures, a film-forming polymer is next selected to be combined with the dye-solvent solution. The mechanism or function of the polymer in this invention is believed to be essentially physical; acting as a thickening agent for the stenciling ink as well as forming a residual dried, flexible film that can ultimately be peeled away from a substrate surface. The range of polymers useful in the stencil dying method of this invention is, therefore, not particularly limited. It has been found that the film-former can be chosen from a remarkably broad range of polymers, as long as the polymer is miscible or dissolvable within the selected solvent or solvent system of the dye solution. The choice of specific polymer is, therefore, not critical to the process of this invention. In addition, the polymer should be combined with the solvent or solvents in sufficient amounts so that it provides a suitable thickening means for the dye stenciling ink. An ink adequately thickened will have a paste-like or stiff consistency to prevent the ink from running or moving on its own accord.

Generally, an adequate polymer thickening means for a stencil dyeing ink according to the present invention is one that enables the dye solution to stay substantially within the boundaries of the stencil openings. A dye solution so adequately thickened prevents seepage of the solution underneath the stencil perforations or openings, which seepage could obliterate or otherwise degrade the stencil image.

More importantly, it has been shown through testing by the present inventor that when the selected dye solvent stenciling solutions are so thickened, to the degree where stencil seepage is eliminated or substantially reduced, exceptionally strong and thick films generally develop upon evaporation of the solvent. These procedures generally yield films that are from two percent to twenty-five percent of the thickness of the wet mixture.

In the practice of the invention, a dye and solvent are first selected, as previously discussed, for their ability to dye or dye-penetrate a specific article. Articles selected for this dye stenciling process include both synthetic and natural leather materials and thermoplastic articles. Examples of these include soccer balls, footballs, basketballs, volleyballs, highway cones, etc. Leather fielding gloves and clothing articles such as leather belts can also be dye stenciled successfully according to this inventive process. The article's surfaces are generally smooth and somewhat shiny. While some of the surfaces are lightly textured, they do not have the consistency of suede.

A thickened dye stenciling ink is formed by combining a film-forming polymer material in sufficient amounts with the dye and solvent according to the above requirements. The film-forming polymer material must, of course, be compatible and dissolvable within the solvent and dye solution as discussed above. The dye and solvent selected are dependent, of course, upon the composition of the target article as also mentioned earlier.

With the adhesive backed stencil sheet placed and secured on the target article, the thickened stenciling ink can next be applied. The ink is generally spread out over the stencil opening thereby allowing it to contact the article's surface and an area immediately surrounding the stencil opening. An applicator such as a brush, rod, roller, or spatula, etc. can be used to evenly spread the thickened ink in the conventional manner. The ink is then allowed to stand for a period of time so that the dye and solvent can act upon the substrate and so that drying eventually occurs by the evaporation of the solvents. The drying times are dependent upon the evaporation rate of the specific solvent or solvents. A hardened and relatively thick film is left as a residual of the evaporation process. The film adheres to both the target surface and that portion of the stencil surrounding the stencil opening.

In the last step of this process, the stencil is removed and with the stencil the attached dried and thick film is also surprisingly removed, revealing a novel feature of this invention. A preferred method for removing the stencil sheet and dried film from an object surface consists of grasping a short of the stencil sheet and peeling it parallel to a long axis of the sheet, away from the object surface. The article is left with characters or symbols dye-penetrated on and through its surface and requiring no washing step to remove residual thickening material.

That this film can be removed with the stencil sheet and somehow overcome its adhesive attachment to a substrate, e.g., an object surface, is indeed a wholly novel, unexpected, and time saving result. These results are even more surprising when one considers how specific polymers, in the form of resins and film-formers, are used for the opposite purpose as binders in ink and pigment coating systems.

While the use of polymer film formers in pigment coating and marking systems is not novel, their wide application as binders has an entirely different and opposite purpose than that of the present invention. Polymers used as binders in prior art inks, are used in relatively low concentrations. The present inventor is unaware of any prior art inks which utilize a polymer binder in concentrations even approaching the high concentrations which are believed to be an essential factor in allowing for the releasability of the dried film in the present invention. In contrast, the purpose of the polymers used as binders in prior ink and pigment coating systems is intended to not only increase the ability of the ink to be spread, but to actually increase the adhesion of the pigment particles to a substrate while also protecting the substrate's surface.

A thorough understanding of the exact mechanisms involved in the novel peelability of the film from an article's surface, along with the stencil, may not be entirely known. There are, however, some underlying or controlling factors that have been observed through an extensive testing of a wide range of materials performed by the present inventor.

An adhesive-type bond develops between the dried film produced by the polymer film-former used in this invention and both the target object's surface and the surface of the stencil surrounding a stencil opening. This bond or adhesive force between the dried film and both the target substrate and the stencil surface is likely due to several factors. There is the specific adhesion of molecular attraction that occurs between the adjoining surfaces, which can be at work here or the force of mechanical adhesion, which occurs between an object's porous or relatively rough surface. More than likely, some combination of these forces provides the effective adhesion.

There are also a number of factors that appear to work alone or together to lower the strength of this adhesive bond and thereby enable the adhesive bond to be broken. These factors are considered to be important elements that provide an insight into the operation of this invention. These factors either cause a decrease in the adhesive attraction between the two surfaces or they increase the stress or force which pulls the two surfaces or layers apart.

The basic types of stress forces exerted to pull adhesive bonds apart include tensile, shear, cleavage and peel. It is the peel force that is involved when a flexible surface is removed from an object. Stress is focused or concentrated along a thin line at the edge of the bond. This line is the precise point where an adhesive would separate if the flexible surface were peeled away from its mating surface. Once peeling has begun, the "stress line" stays out in front of the advancing bond separation.

This peel stress is considered to be one of the strongest forces acting to overcome adhesion. It also appears to be one of the primary operating forces in this invention that allows for the removal of the dried film from the surface of the substrate. In this invention the peel force is initiated at the point or line where the dry film forms an arch or bridge over an area on the stencil immediately adjacent the edge of the stencil opening and the target surface. This overlapping or "bridging", which is encouraged in this present invention, is very often considered an undesirable phenomenon in many coating applications. Bridging can occur, for example, when a thin paint film is applied along and over the edge of masking tape for the purpose of forming a painted edge or straight line. After the paint dries and the tape is removed, occasionally, a thin sheet of paint is inadvertently lifted up on the overlapping edge and removed along with the tape. This undesirable effect usually necessitates touch up or repainting.

It is at this bridge then or where the stencil's opening boundary and substrate surface are overlapped by the dry film, that the peel forces begin to attack the adhesive bond at its weakest point. The moment the stencil is lifted up the peel forces begin while at the same time tensile force or stress is placed upon the dried film. The tensile strength of the thick film together with these peel forces apparently is able to overcome the adhesive bond without the film breaking or tearing apart. The thick films adjacent to each stencil opening are removed with the stencil and remain attached to the stencil sheet, forming a continuous film over the stencil opening. The article is left with characters, symbols or other indicia dye-stenciled and penetrated into its surface.

There also appears to be certain additional factors that can operate to facilitate the release of the film from the target surface. These additional factors work by decreasing the adhesive attraction between the dried film and the target substrate.

It is well known that certain additives, adjuvants, or other materials including plasticizers are added to many thermoplastic formulations. These added materials give the thermoplastic articles certain properties or characteristics that would not otherwise be available or attainable. Plasticizers, for example, can provide elasticity and flexibility to the thermoplastics. Since these qualities are essential attributes in synthetic manufactured athletic balls, which is one of the focuses of this invention, it is assumed that these additives or plasticizers are important material components. Indeed, plasticizers are often used in such high concentrations that they impart a slight oily residue or feel on surfaces of some thermoplastic athletic balls.

It is thought that these additives in the form perhaps of plasticizers or other materials may contribute to the process of this invention. It is quite likely that they interfere with or weaken the adhesive bond between the dried film-forming polymer and the target object's surface.

It is also here further hypothesized that the solvent of the dye mixture may further weaken the adhesive bond through its effect on the plasticizers or other additives within the thermoplastic article. The solvent could allow the plasticizers or other additives to somehow be freed from their subsurface attachments or positions so they could migrate to the article's surface where the adhesive bonding takes place.

There also exists in leather articles natural oils such as lanolin as well as synthetic oils which give leather its characteristic suppleness and softness. These oils are almost always present in leather to some degree and give the leather its flexibility and prevent its cracking. These oils are believed to act, in this invention, similar to the plasticizer and additives discussed above. They are, therefore, also likely to facilitate the film's release, in the same way, by interfering with the adhesive bond between the dried film and the substrate. It has been found, through testing, that in some instances the dried polymer film does not release cleanly or entirely on selected surfaces according to the novel feature of this invention. A number of factors have been found to restrict the film's clean release. Rough or non-smooth surfaces and extending fibers and filaments like those found on suede or felt-like articles are some examples of these factors. These factors are thought to make the film release more difficult by increasing the mechanical attraction between the surface and the films.

It is believed that sometimes the selected material does not release films because its surface is very dry or depleted of natural or synthetic oils. In some of these cases the release of the film can sometimes be achieved by adding more film-forming polymer, thereby increasing the film's thickness. In other cases film release has been achieved through the actual addition or reintroduction of various oils, lanolin, or other release agents by application of the material directly to the article's surface. This is done prior to application of the dye stenciling mixture.

In those instances on occasion when the dried film still will not release adequately from the target substrate or will only partially release, there is yet another means to achieve or facilitate the films' release. A release agent such as an oil or grease or even a combination of agents can actually be added or combined directly with the stenciling mixture during its formulation. The release agent should be present in an amount to insure easy removal of the dried film. The particular release agent or agents should be selected, of course, for compatibility with the rest of the components of the stenciling mixture. This has been successfully accomplished using a wide variety of release agents. The release agents employed in this way appear to also function by interfering with the adhesive bond between the film-forming polymer and the substrate.

The release agents, combined with the stenciling mixture in this manner, are similar to the formulations used in the solvent-based strippable, peelable or protective film technologies. In those technologies, a release means or agent is added to a polymer film-forming solution and is applied to an article and then allowed to dry. The polymer solution hardens to form a protective film over the article while the release agent, for example in the form of an oil or wax reduces the adhesive bond, allowing the hardened film to be easily stripped or peeled and removed.

It should be understood that the specific type of release agent or agents employed as well as their amounts used for the purpose of facilitating the release of the dried film from the target substrate could depend upon numerous factors. Such factors including, for example, the release agent's compatibility with the other chemical components, the amount of release desired and so on.

The scope of release agents useful in the method of providing a release means to the stenciling mixture is not that particularly limited. Furthermore, the actual selection of release agents and the amounts used will be readily selected by those skilled in the art.

Proper testing, of course, should be done with the selected release agents to achieve the desired degree of releasability without any detrimental effects to the dye stenciling process of this invention. In this regard, caution should be observed, since an overabundance of release factor has shown a tendency to cause weak films, as well as a decreased penetration of the dye into the substrate.

Some release agents found useful in this aspect of the invention include: mineral oil, linseed oil, castor oil, silicone polymers, synthetic waxes, unsaturated fatty acid-monoamides, polyethylene glycol monostearate, fatty bisamides, and various plasticizers. It is, of course, understood that other agents may also be employed and that the foregoing compounds are merely exemplary.

In the formulation of stenciling inks according to the present invention, suitable secondary ingredients, conventional adjuvants or modifiers may be added to adjust the composition for various reasons. The adjuvants employed, for example, such as anti-foaming agents, thickening agents, stabilizers, dispersing aids, wetting agents, dye fixatives, antistats, bactericides, and antioxidant agents, will be readily selected by those skilled in the art. They can be used for various purposes such as adjusting the consistency of the ink and are not considered critical in relation to the practice of this invention. Caution, however, should be exercised in adding any adjuvant less it adversely effect the desired adhesive balance of the system, the thickness and strength of the dried films or the penetration and coloration by the dyes. Final selection of materials or additives should, of course, depend upon the result of thorough testing.

The formulation of a stenciling inks according to the present invention can begin once the dye, solvent system, and polymer film former have been selected. The dye and solvent system are selected or tested for their combined ability to color and penetrate a specific target object made of a specific material. The polymer is chosen so that it will dissolve within the specific selected solvent system. Those polymers obviously should be avoided which only swell in the solvent or partially dissolve as a gel. Alternately, a polymer film-former can be chosen so that it can be dissolved in another solvent and the mixture then combined with the dye and solvent. One skilled in the art should readily choose an appropriate polymer. Formulators can rely on prior experience with solvents and polymers or they can consult the various available reference guides. Union Carbide Chemicals and Plastics Company Inc. for example, provides reference guides for easy referral and consultation on this topic. One of their guides is the UCAR Performance Solvents Selection Guide for Coatings, which includes resin solubility data as well as solvent selection recommendations. Another approach would be to consult the product brochures and technical data sheets from the manufacturers of a specific polymer under consideration. Hercules Inc., of Wilmington, Del., for example, is a producer of ethylcellulose and makes available an extensive manual on this product. Their manual includes recommended solvents, solubility tables, physical properties, etc. Since this information is widely available, it is not considered necessary to reproduce these tables herein. One can also consult authorities such as The Chemistry of Organic Film Formers by D. H. Solomon, John Wiley and Sons, Inc., 1967 or Polymeric Materials by Charles C. Winding, Mcgraw-Hill Book Company, Inc., 1961.

Although the use of the polymer film-former in the described manner is a novel feature of this invention and relates to the essence of the invention, the actual choice or selection of specific materials is not critical to the process. The choice of specific film-forming polymers will depend on other factors, especially the requirements of the solvent system. Those skilled in the art of polymer chemistry and dye manufacturing and formulation will recognize that the particular physical characteristics herein described can be found in a wide range of different polymer materials and structures. Furthermore, it is considered to be outside the realm of practicality for this specification to list every possible film-forming polymer which may be useful under every possible application. The following descriptions of film-forming polymer resins, therefore, are not meant to limit the scope of useful materials but merely to serve as examples. Some polymers, which may be useful in certain applications, include: the broad class of derivatives of natural products including: natural resins, rubber derivatives, and cellulose derivatives; including cellulose esters such as cellulose nitrate, cellulose acetate, cellulose acetate-butyrate and cellulose propionate and cellulose ethers such as methyl cellulose, ethyl cellulose and carboxymethyl cellulose. Polymers suitable for consideration in the present invention also should include varnishes, synthetic resins, alkyd resins and those resins formed by condensation polymerization such as phenolic resins, amino resins, polyesters, polyurethanes, polyamides, epoxides and polyethers. In addition, ethenic polymers that should be considered include: polyethylene, polypropylene, polyisobutylene, fluorocarbon polymers, polyvinyl acetate and its derivatives such as polyvinyl alcohol, vinyl polymers and copolymers, vinyl chloride polymers and copolymers, polyvinylidene chloride, polystyrene, acrylic polymers, coumarone-indene polymers, polyvinyl ethers, polyvinyl ketones, polyvinyl amines, fluorine-containing polymers and divinyl polymers. Epoxy resins and synthetic rubbers and silicones and their derivatives should also be considered as suitable polymers in the present invention.

Some specific film-forming polymers and compatible dyes and solvents are provided in the examples section of this patent application.

Many dyes are known and commercially available and an extensive enumeration thereof is not necessary for one skilled in the art to clearly understand and reproduce the herein-claimed invention. In as much as the knowledge of specific dyes is not essential to the understanding of this invention, it is thought that the examples to follow will provide adequate illustration as to their use in this invention. The examples used are not meant to be all-inclusive but are merely used as examples to illustrate the workings of this invention.

The amount or concentration of dye used varies dependent on the type and action of the dye chosen and the desires of the practitioner. Those skilled in the art will know the concentrations at which the dyes are suitably employed in the dye formulations without further elaboration herein. Suffice it to say that the dyes are typically used at a concentration of from about two to eight weight percent, based on the total weight of the entire stenciling inks.

The novel stenciling inks are produced by combining the components specified above using known or established techniques until a uniform mixture is obtained. It is recommended, however, that the polymer film-former be thoroughly mixed with at least a portion of the solvent before the dye is added thereto in order to achieve a homogeneous mixture. Generally, the polymer film-formers, which are available as powders, granules, or pellets, should be gradually added to the agitated solvent system until the required thickness or viscosity is achieved. The dye can then be added directly to the mixture or it can be initially mixed with some of the solvent, if desired, and then mixed with the other components. When an agent or adjuvant is added for any purpose, it is normally preferred to add such agent last so as to facilitate the blending of the various ingredients.

The viscosity of the stenciling ink is important since it prevents the dye solution from flowing beneath the stencil. The viscosity also has a bearing on the thickness of the final films. There is a wide range of viscosities considered allowable with this invention, however, a viscosity approximating that of honey at room temperature has been found to be most effective. It is also recommended that the viscosity of the ink be controlled primarily by the concentration of the polymer and not by the addition of thickening agents such as fumed silica, etc. It has been found that such additives or any additive used in excess can cause weak or thin films upon evaporation of the solvent. Such films can easily tear or break apart upon removal of the stencil and be difficult to remove from an object surface.

The viscosity of the ink will naturally vary proportionately to the concentration of film-forming polymer in the ink. The greater the percentage of film-forming polymer, the greater the viscosity. The viscosity will also vary according to the actual type of polymer employed as well as its specific molecular weight. The viscosity can be increased or decreased in the conventional manner by adjusting the percentage of polymer or any of the other solids in the ink.

It has been found through testing that formulations that have higher viscosities, due to increased concentration of polymer film-formers, generally yield thicker films upon evaporation of solvents and provide increased protection against dye seepage around and underneath the stencil opening. However, these higher viscosity formulations have a tendency to restrict the penetration of dye into the substrate. This later tendency is believed due to the decreased solvent percentage in the higher viscosity inks and a resulting lack of solvent available to interact with an object's surface or to carry the dye deep into the object's material.

Stenciling inks with lower viscosities have the opposite effect. The films yielded upon evaporation of solvents are generally thin and dye solution seepage is more of a problem, however, there is an increased penetration of dye into the object surface.

The particular viscosity required for a stenciling operation will depend on such factors as the chemical and physical structure of the object material, the material's surface characteristics and the degree of dye penetration required by the practitioner. It is well within the ability of the skilled worker to vary concentrations of the components within the limits noted above to achieve the desired viscosity in the dye stenciling ink.

With the adhesive backed stencil firmly attached to an object surface, the stenciling ink can be applied with any suitable instrument such as a brush, stirring rod or spatula. The ink is spread generously and thickly over and slightly around each stencil opening thereby ensuring that an adequate amount of ink contacts the object surface. Sufficient stenciling ink should overlap adjacent stencil openings to effect bridging of adjacent dried films. The user should strive to apply the viscous ink quite generously in the area described so that effective dye penetration of the object surface and strong dried films occur as a result. Care should be taken to avoid applying the ink so that it does not drip or flow beyond the intended area. The viscosity of the ink determines to some extent how thick the composition can be spread on the stencil. There is, however, a wide variation as to the degree of thickness the composition can be spread over and about stencil openings, while still providing effective dye penetration and strong film-forming ability.

Although precise specifications of details of hand application of the peelable stenciling ink is not necessary, some specific parameters may be useful. Satisfactory results have been achieved with this invention on a wide range of materials, using an ink applied as thinly as 0.5 millimeter or as thick as 10 millimeters or more. It has been found, however, that the most effective results with this invention occur when one strives to apply the ink generally between 1 millimeter and 5 millimeters in thickness. After the ink is applied to the stencil and an object surface, it is allowed to stand for a sufficient amount of time to allow the solvent portion of the ink to evaporate. This can require anywhere from a few minutes to several hours or more depending on such factors as; the evaporation rate of the solvent, the thickness of application, the adjuvants employed, ambient temperatures, etc. The dried films that are left as a residual generally range in thickness from about two percent to about twenty-five percent of the thickness of the original wet composition. The actual thickness of these films, however, can vary according to numerous factors. Some of these factors include the following: the amount of ink actually applied or the degree of thickness in which the ink is spread about the stencil; the concentration or percentage of film-forming polymer used in the ink, the specific type and molecular weight of polymer film former employed; and the nature and amount of adjuvants added, if any, to the ink.

Once it has been determined that the applied ink has thoroughly dried, the stencil is removed and the effectiveness of the film removal, dye penetration and stencil dye character formation is evaluated. The dried film should be completely removed with the removal of the stencil and the dye penetration; coloration and stenciled character formation on the object surface should be satisfactory.

If the ink was not adequately thickened, it can leak or run under a stencil opening and obliterate the characters, or other indicia. Increasing the percentage of solids in the ink usually solves this problem. This is preferably accomplished by increasing the amount of film-forming polymer.

The dye stenciled portion of the object surface can be tested for depth of dye penetration by scratching, scoring, filing, abrading, or otherwise removing some of the material of the object surface with any appropriate instrument. The results can be observed and accordingly, appropriate changes can be made. If a deeper dye penetration or a darker color is desired, the dye and or solvent concentration can be increased or some other modification in the formula can be made by one skilled in the art. If the initial testing of a particular material surface with the dye and solvent, as described earlier, was adequately performed, an increase dye penetration or increased coloration can usually be achieved by increasing the percentages of one or both of these components.

On occasion, the dried film can break or it will not release adequately upon attempted removal from a surface. When this happens, adjustments in the formulation can again be made. Often this condition can be remedied by merely increasing the thickness of the dried film, either by applying the stencil ink more thickly or by increasing the percentage of polymer in the formulation or some combination of both. If increasing the thickness of the film does not provide for adequate release then various release adjuvants alone or in combination in the form of oils, plasticizers, etc. may be added to the article's surface, or included in the formulation of the ink.

Leather articles that are very old, dried out, or have been excessively processed with chemicals, can be devoid of natural or synthetic oils. These oils usually provide some natural release to the films so that they can be easily removed. When these oils are lacking, a resultant increase in adhesion to the leather by the selected films can sometimes be observed. The addition or re-introduction of conditioning oils such as lanolin and the like to the leather's surface, however, can often solve this problem. The material should be applied sparingly with a rag, sponge, brush, or other similar device. The oils or conditioner can be allowed to penetrate the article's surface and the excess removed with a cloth.

If one chooses to use one or more release agents in the formulation, it has been found beneficial to slowly add the release agent to the dissolved polymer and solvent solution so that a homogeneous solution is achieved. Small amounts of release agent should be gradually added to the formulation. The performance of the ink can then be tested with the stencil and a particular material surface. If necessary, the percentage of release agents can be gradually increased to achieve the desired release level. In this manner, a minimum amount of release agent will used to achieve an effective degree of film release. The result should be a minimum interference, by the release agent, on the dye stenciling process.

The amount of release agent can vary from as little as one percent to as much as twenty-five percent or more of the total ink weight. Care, therefore, should be undertaken when adding such agents or any agent so that they do not adversely effect some aspect of the dye stenciling process. A reduction in the overall viscosity of the solution, by the release agent, is one obvious concern, which should be monitored closely.

On the basis of the foregoing considerations, one skilled in the art will be able to formulate and manufacture a number of different stenciling inks having properties described. The actual manufacture and formulation of such inks will follow known, established techniques in the art. In addition, one skilled in the art should be able to apply these inks to selected articles in the novel method as described, for the purpose of dye-stenciling and dye-penetrating characters or other indicia on the surface of the articles. Articles such as sport and athletic balls made of leather or thermoplastic materials, as well as other leather articles including baseball fielding gloves can be successfully dyed and penetrated with the novel method of this invention. In order to show more clearly the scope of this invention and the applicability of this process to the dye-stenciling of different materials, the following examples are provided. These examples, however, are for the purpose of illustration only and are not intended to limit the invention in any way.

EXAMPLE 1

A dye stenciling ink was first prepared using the following procedures. To about 55 grams of toluene was slowly added 10 grams of ethyl cellulose under vigorous mixing and stirring at room temperature. The mixing was continued until the ethyl cellulose had substantially gone into solution. The mixing was accomplished by using a hand held mixing instrument. The ethyl cellulose employed here was labeled EC N 20 obtainable from the Hercules Company of Wilmington, Md. The material is available in fine white granules. About 4 grams of dye is added to the mixture under vigorous stirring for several minutes to achieve a uniform dispersion of the dye.

A suitable dye is an azo class dye such as that commercially available from Chemserve Corporation of Detroit Mich. under the name Solvoil Black BN.

An adhesive backed stencil sheet was prepared from 100-lb. paper tag material. A perforation having the shape of a letter or some other character or symbol approximately three-quarters of an inch in height and width was formed in a central area of the sheet. A suitable pressure sensitive adhesive, i.e., one that will form an immediate bond with the substrate and provide moderate attachment to the substrate while also allowing for easy stencil removal was applied to the reverse side of the sheet. The adhesive used in this example was obtained from 3M® company under the product name of #400 Hi-tack Acrylic. The prepared stencil was applied and secured with finger pressure in separate tests, to the surfaces of both a standard outdoor "rubber" basketball of PVC composition and a leather, indoor-use basketball.

The prepared stenciling ink was next applied with a stick to the basketballs' surfaces through the stencil opening and over the stencil area immediately surrounding the opening. Effort was made to apply the ink thickly so that it generally formed a coating from about 1 mm to 5 mm thick. Care was exercised to prevent the ink from running or dripping along the ball's curvature or beyond the applied area. The applied ink and stencil were allowed to stand for a sufficient period of time to allow the solvent to evaporate. Several hours were given for the ink to completely dry and harden. Once the ink had dried, the stencil was easily removed and with it the dried film and any residual dye, revealing a black letter or symbol sharply stenciled and demarcated on the basketball's surface. No washing step was necessary to remove the dye thickeners or dye remnants. The dye penetration was then tested by subjecting the dyed portion of the balls to the abrasion action of a file. The results of the file test revealed dye penetration ranging from approximately 0.25 mm to 0.5 mm or more on the leather ball and from about 0.5 mm to around 2 mm in depth on the rubber PVC ball.

EXAMPLE 2

Using a procedure similar to that of example 1, a dye stenciling ink was prepared at room temperature by slowly adding about 10 grams of polyvinyl butyral to 58 grams of 200 proof ethanol. The polyvinyl butyral employed here was available in fine white granular or powder form and is obtainable from Monsanto Chemical Company of St. Louis, Mo. under the brand name Butvar®. The mixture was again stirred using conventional mixing procedures so that the resin was sufficiently dissolved within the solution. About 4 grams of a dye was added to the mixture under vigorous stirring until a uniform dispersion was achieved. A suitable dye is a phthalocyanine class dye such as that commercially available from Crompton and Knowles Corporation of Charlotte, N.C. under the name Intraplast Brill Blue GN.

A stencil and adhesive similar to that used in example number 1 was prepared and placed as before but on the surface of a soccer ball. The ball was a shiny, Orano® brand soccer ball labeled "Tuff". The ball was composed of Cordley®, a proprietary synthetic leather material of English manufacture. The stencil ink was applied to the ball and stencil in the manner previously discussed and the ink was again allowed to thoroughly dry. Upon removal of the stencil, the attached polyvinyl butyral film and dye remnants of the ink also were cleanly and entirely removed leaving a deep royal blue character sharply imprinted upon the ball's surface. No washing procedure was necessary to remove the dye thickening agent or excess dye material. The dyed surface was not negatively affected by light to moderate scraping with a knife-edge, indicating satisfactory dye coloration and penetration.

EXAMPLE 3

Using a procedure again similar to that of example 1, a dye stenciling ink was prepared at room temperature by slowly adding 10 grams of polyvinyl chloride to 60 grams of cyclohexanone. The mixture was stirred, as in previous examples, using conventional mixing procedures so that the PVC had substantially dissolved. Approximately 7 grams of dye was added to the mixture under vigorous stirring so that a uniform dispersion was again achieved. A suitable dye is an anthraquinone class dye, such as that commercially available from Crompton and Knowles Corporation of Charlotte, N.C. under the name Oil Soluble Green.

A stencil with pressure sensitive adhesive backing similar to that used in example 1 was used and applied in like fashion to the surface of a standard "rubber" outdoor type PVC basketball. The stenciling ink was applied to the ball and stencil in the manner previously described in example 1 and the mixture was given several hours to thoroughly dry. The stencil was next removed and with it's removal the attached dried PVC resin and excess dye remnant was also entirely removed, revealing a deep black character sharply imprinted on the surface of the ball. No washing step was necessary to remove any dye film, thickener, or excess dye. The dyed portion of the ball was subjected to vigorous filing that demonstrated dye penetration up to 2 mm below the surface of the ball.

EXAMPLE 4

Using a procedure similar to that of example 3, a dye stenciling ink was prepared at room temperature by slowly adding 10 grams of polyvinyl chloride to 60 grams of cyclohexanone. Once the PVC had dissolved using the conventional mixing procedures, about 1.5 grams of fumed silica was added to the solution as an additional thickening agent and mixed so that a homogeneous mass was achieved. Approximately 4 grams of dye was added to the mixture under vigorous stirring so that a uniform dispersion was again achieved. A suitable dye is an anthraquinone class dye, such as that commercially available from Crompton and Knowles Corporation of Charlotte, N.C. under the name Atlasol Blue G.

A stencil with pressure sensitive adhesive backing similar to that used in the fist example was applied as before but on a natural leather indoor basketball. The ink was applied to the ball and stencil as in example 1, and the composition was allowed to dry thoroughly. The stencil was then removed, taking with it the dry resin, fumed silica and any dye remnant. A blue/black character was sharply imprinted on the ball's surface. No washing step was needed to remove the resin, fumed silica or any excess dye material. The dye penetrated the leather ball to the extent that scraping with a knife-edge would not remove the dye unless the ball's surface was deeply abraded.

EXAMPLE 5

Using a procedure similar to that of example 1, a dye stenciling ink was prepared at room temperature by slowly adding 12 grams of cellulose acetate butyrate to 50 grams of cyclohexanone. The mixture was again vigorously stirred using conventional mixing procedures. It was also necessary to allow the resin to soak in the cyclohexanone solvent for some time in between stirring, in order for it to completely dissolve. Once the resin had substantially dissolved in the solution, approximately 4 grams of dye was added to the mixture under vigorous stirring so that a uniform dispersion was again achieved. A suitable dye is a phthalocyanine class dye, such as that commercially available from Crompton and Knowles Corporation of Charlotte, N.C. under the name Intraplast Brill Blue GN.

A stencil was constructed from a 2.5-mil polystyrene material. The pressure sensitive adhesive backing used was an emulsion acrylic type adhesive from 3M company labeled AP-360. The stencil was applied in the manner as in previous examples but on a natural leather baseball fielder's glove. The ink was applied generously to the glove and stencil as in example 1 and the ink was again allowed to dry thoroughly. The stencil was then removed taking with it the dry resin and any dye remnant. A dark bright green character was sharply imprinted on the glove. No washing step was needed to remove the resin or dye thickener. The dye penetrated the glove to the extent that scraping with a knife-edge would not remove the dye unless the glove's surface was severely abraded.

EXAMPLE 6

Using a procedure similar to that of example 1, a dye stenciling ink was prepared at room temperature by slowly adding about 15 grams of poly(methylmethacrylate) resin to 35 grams of acetone. The poly(methylmethacrylate) employed here was a high molecular weight form available in fine white clear granules and is obtainable from Avocado Research Chemicals Ltd, in Heysham, Lancs. The mixture was again stirred using conventional mixing procedures so that the resin was sufficiently dissolved with the solution. About 3 grams of a dye was added to the mixture under vigorous stirring until a uniform dispersion was achieved. A suitable dye is a disazo class dye such as that commercially available from Crompton and Knowles corporation of Charlotte, N.C. under the name Intrazone Fast Blue 5R EX CONC.

A stencil and adhesive similar to that used in example number 1 was prepared and placed as before but on the surface of a synthetic leather soccer ball. The ball is an Orano® brand and is composed of a proprietary material called Barex®, believed manufactured in Japan. The stencil ink was applied to the ball and stencil in the manner previously discussed and the composition was again allowed to thoroughly dry. Upon removal of the stencil, the attached resin film and dye remnants also were cleanly and entirely removed leaving a charcoal grey character sharply imprinted upon the ball's surface. No washing procedure was necessary to remove the dye thickening agent or excess dye material. The dyed surface was not negatively affected by light to moderate scraping with a knife-edge, indicating satisfactory dye coloration and penetration.

EXAMPLE 7

Using a procedure similar to that of example 6 above, a dye stenciling ink was prepared at room temperature by slowly adding about 15 grams of poly(methylmethacrylate) resin, as was used in example 6 above, to 35 grams of acetone. The mixture was again stirred using conventional mixing procedures so that the resin was sufficiently dissolved within the solution. Approximately 3 grams of mineral oil available from the Exxon Corporation and labeled Coray 46 was next mixed thoroughly into the solution. About 3 grams of a powder dye was then added to the mixture under vigorous stirring until a uniform dispersion was achieved. A suitable dye is a phthalocyaine class dye such as that commercially available from Crompton and Knowles Corporation of Charlotte, N.C. under the name Intraplast Brill Blue GN.

Stencils and adhesive similar to that used in example number 1 were prepared and placed as before but on the surfaces of both a leather indoor basketball and a leather baseball fielder's glove. The stencil ink was applied to both the ball and the glove as well as to the stencils in the manner previously discussed. The ink was again allowed to thoroughly dry. Upon removal of the stencil, the attached resin film and dye remnants also were cleanly and entirely removed leaving an emerald green character sharply imprinted upon the surface of both the ball and glove. No washing procedure was necessary to remove the dye thickening agent or excess dye material. The dyed surface was not negatively affected by light to moderate scraping with a knife-edge, indicating satisfactory dye coloration and penetration.

EXAMPLE 8

Using a procedure similar to that of example 1, a dye stenciling ink was prepared at room temperature by slowly adding 7 grams of Hydroxyethyl cellulose to 33 grams of water. Once the resin had dissolved using the conventional mixing procedures, about 3 grams of dye was added to the mixture under vigorous stirring so that a uniform dispersion was again achieved. A suitable dye is a disazo class dye such as that commercially available from Crompton and Knowles Corporation of Charlotte, N.C. under the name Intracid Black ZB CONC. A stencil of approximately a half of an inch in height and width was constructed from a 2.3-mil polyester material. The stencil was backed with an emulsion acrylic adhesive labeled HP-395, available from 3M® Company. The stencil was applied as before but on a natural leather belt that was purchased at a retail store. The belt used in this test had a smooth surface and appeared to have been previously stained a light tan color. The ink was applied to the belt and stencil as in example 1 and the composition was allowed to dry thoroughly. The stencil was then removed, taking with it the dry resin and any dye remnant. A black character was sharply imprinted on the belt's surface. No washing step was needed to remove the resin or dye thickener. The dye penetrated the leather belt to the extent that scraping with a knife-edge would not remove the dye unless the belt's surface was significantly abraded.

EXAMPLE 9

Using a procedure similar to that of example 1, a dye stenciling ink was prepared at room temperature by slowly adding 25 grams of polystyrene to 30 grams of ethyl acetate. The average molecular weight of the polystyrene is 250000. It is available through Acros Organics of New Jersey. The mixture was again vigorously stirred using conventional mixing procedures. Once the resin had substantially dissolved in the solution, approximately 4 grams of dye was added to the mixture under vigorous stirring so that a uniform dispersion was again achieved. A suitable dye is an azo class dye, such as that commercially available from Chemserve Corporation of Detroit, Mich. under the name Solvoil Black BN.

A stencil with pressure sensitive adhesive backing like that used in the first example was applied as before but on a natural leather baseball fielder's glove. The ink was applied to the glove and stencil as in example 1 and the composition was allowed to dry thoroughly. The stencil was then removed taking with it the dry resin and any dye remnant. A charcoal color character was sharply imprinted on the glove. No washing step was needed to remove the resin or dye thickener. The dye penetrated the glove to the extent that scraping with a knife-edge would not remove the dye unless the glove's surface was badly damaged.

EXAMPLE 10

Using a procedure similar to that of example 1, a dye stenciling ink was prepared at room temperature by slowly adding 10 grams of polyvinyl alcohol to 40 grams of water. Once the resin had dissolved using the conventional mixing procedures, about 3 grams of a liquid dye solution was added to the mixture under vigorous stirring so that a uniform dispersion was again achieved. The liquid dye used in this example was available from Fiebing Company of Milwaukee, Wis. The dye is their standard liquid leather dye labeled "dark brown" and is available in retail stores where leather working materials and leather goods are merchandized.

A stencil with pressure sensitive adhesive backing similar to that used in example number 1 was applied as before but on a natural leather belt that was purchased at a retail store. The belt used in this test had a smooth surface and appeared to have been previously stained a light tan color. The ink was applied to the belt and stencil as in previous examples and the mixture was allowed to dry thoroughly. The stencil was then removed taking with it the dry resin and any dye remnant. A dark amber colored character was sharply imprinted on the belt's surface. No washing step was needed to remove the resin or dye thickener. The dye penetrated the leather belt to the extent that scraping with a knife-edge would not remove the dye unless the belt's surface was damaged.

EXAMPLE 11

Using a procedure similar to that of example 1, a dye stenciling ink was prepared at room temperature by slowly adding about 17 grams of ABS resin to 37 grams of MethylEthyl-Ketone. The ABS resin employed here is available in gray clear small pellets and is obtainable from GE Plastics of Maumee, Ohio under the product designation GTM5300. The mixture was again stirred using conventional mixing procedures so that the resin was sufficiently dissolved within the solution. About 3.25 grams of a dye powder was added to the mixture under vigorous stirring until a uniform dispersion was achieved. A suitable dye is an anthraquinone class dye such as that commercially available from Crompton and Knowles Corporation of Charlotte, N.C. under the name Atlasol blue G.

A stencil and adhesive similar to that used in example number 1 was prepared and placed as before but on the surface of both a leather indoor basketball and a yellow "rubber" PVC playground ball. The stencil ink was applied to the balls and stencils in the manner previously discussed and the mixture was again allowed to thoroughly dry. Upon removal of the stencils, the attached resin film and dye remnants also were cleanly and entirely removed, leaving a black character sharply imprinted upon the ball's surfaces. No washing procedure was necessary to remove the dye thickening agent or excess dye material. The dyed surfaces were not negatively affected by light to moderate scraping with a knife-edge, indicating satisfactory dye coloration and penetration.

EXAMPLE 12

In this most preferred example, a dye stenciling ink was again prepared using the previous procedures. About 24 grams of xylene was combined with 6 grams of n-butanol. To this solution was slowly added 11.5 grams of ethyl cellulose under vigorous mixing and stirring at room temperature. The mixing was continued, in similar fashion as in example one, until the ethyl cellulose had substantially gone into solution. The ethyl cellulose employed here was labeled EC N 20 and is obtainable from the Hercules Company of Wilmington, Del. The material is available in fine white granules. About 6 grams of Coray 46 mineral oil and 3 grams of raw castor oil were next thoroughly blended into the above mixture. About 3 grams of dye was added to the mixture under vigorous stirring for several minutes to achieve a uniform dispersion of the dye. A suitable dye is an azo class dye such as that commercially available from Chemserve Corporation of Detroit, Mich. under the name Solvoil Black BN.

Adhesive backed stencils were prepared from 60-lb. litho paper. Stenciled letters of approximately three fourths of an inch in height and width were formed in the central cutout areas. The adhesive used in this example was obtained from 3M company under the product name of #300 high strength acrylic. The prepared stencils were applied and secured with finger pressure to the surfaces of two synthetic leather basketballs of unknown composition. One ball was manufactured by Spalding Sporting Goods Company and was labeled 2K Composite. A company called Apex manufactured the other ball.

The prepared stenciling ink was next applied in the manner of the previous examples. The applied ink and stencils were again allowed to stand for several hours, i.e., for a sufficient period of time to allow the solvent to evaporate. Once the ink had dried, the stencils were easily removed. The dried films and any residual dye was removed along with the stencils, revealing a black letter sharply stenciled and demarcated on both of the basketballs' surfaces. No washing step was necessary to remove the dye thickeners or dye remnants. Dye penetration was then tested by subjecting the dyed portion of the balls to the abrasion action of a file. The dyed portion of the balls could not be removed without destroying the balls' surfaces.

It can be seen from the above examples and specifications that articles can be dye stenciled according to the novel process of the invention. One can appreciate that this process allows the excess dye and thickener to be removed as a solid film with the stencil's removal, thereby eliminating the heretofore-necessary washing and drying procedures and greatly simplifying the stenciling process. In addition, the articles can be penetrated with a dye, at ambient temperatures, so that subsurface markings can be imparted to them, thus rendering abrasion and wear resistant characteristics to the markings.

Although the above described invention is referenced with many specific details, these should not be construed as limiting the scope of this invention but merely providing illustration of some of the presently preferred embodiments of this invention. As previously mentioned, many of the constituents of this invention can be freely substituted and modifications made by those skilled in the art without departing from the scope of the invention which is defined in the following claims. For example, after markings have been dye-stenciled on an article according to a method of the invention as described above, a localized region of the article which includes the markings may be heated by means of an infrared energy source or hot air gun, to enhance dye penetration into and adherence to the article, and/or to improve color fastness or scuff resistance of the markings.

What is claimed is:

1. A method for imprinting indicia markings onto a surface of an object, the markings penetrating beneath said object surface to thereby impart abrasion and wear resistance to said markings, said method comprising the steps of;

a. securing in fluid-tight contact to said object surface a stencil plate having through a thickness dimension thereof openings having outline shapes corresponding to indicia to be imprinted on said object surface by a semi-liquid peelable ink, said ink comprising, i. a solvent ii. a dye solubilized in said solvent to form a dye-solvent solution penetrable into said object surface, and iii. a film forming substance, b. applying said ink to an obverse side of said stencil sheet and through said opening through said stencil sheet onto said object surface, said applied ink extending beyond said open areas onto adjacent areas of said stencil sheet to thereby form a continuous layer having an outer surface which overlies said openings and adjacent areas of said stencil sheet, and an inner surface which contacts said object surface, said layer having a thickness sufficient to adhere when formed into a solid film sufficiently strongly to said stencil plate to enable said layer to be peelable en masse with said stencil plate from dye-imprinted portions of said object surface, c. allowing sufficient time for said dye to penetrate said object surface, d. allowing sufficient time for said solvent to evaporate and cause said film-forming substance to form a solid film peelable from said object surface, and e. peeling said stencil plate and said solid film en masse from said object surface thereby removing said solid film from and thereby exposing said object surface bearing said indicia markings imprinted on and dye-penetrated into said object surface.

2. The method of claim 1 wherein said stencil sheet is conformed in fluid-tight contact with said object surface by means of a pressure-sensitive adhesive layer between said object surface and a reverse side of said stencil sheet.

3. The method of claim 1 wherein said film-forming substance is further defined as forming upon said evaporation of said solvent a film which is sufficiently lightly adhered to said object surface to be peelable therefrom without damaging said object surface, and sufficiently tightly adhered to said stencil sheet to remain attached thereto when said stencil sheet is peeled from said object surface.

4. The method of claim 1 wherein said film-forming substance is further defined as a polymer soluble in said dye-solvent solution.

5. The method of claim 1 wherein the material of which said object surface is made is further defined as being a leather.

6. The method of claim 1 wherein the material of which said object surface is made is further defined as being a polymer.

7. The method of claim 1 wherein said polymer is further defined as being a thermoplastic.

8. The method of claim 1 wherein said applied layer of ink has a thickness ranging from about 0.5 millimeters to about 10 millimeters.

9. The method of claim 1 wherein said applied layer of ink has a thickness ranging from about 1 millimeter to about 5 millimeters.

10. The method of claim 1 wherein said solid film has a thickness ranging from about 5 percent to about 25 percent of the thickness of said ink layer when said ink layer is wet.

11. The method of claim 1 wherein said ink is further defined as comprising;

a. a solvent, b. a dye dispersable in said solvent to form a dye-solvent solution, and c. a film-forming substance soluble in said dye-solvent solution and hardenable into a solid film upon evaporation of said solvent from said ink, said solid film being peelable from said article surface.

12. The method of claim 11 wherein said dye-solvent solution is penetratable into said article surface.

13. The method of claim 11 wherein said solid film formed by said film-forming substance is peelable from said article surface.

14. The method of claim 13 wherein said film-forming substance is a polymer.

15. The method of claim 13 wherein said film-forming substance is a resin.

16. The method of claim 1 further including a release agent for facilitating peelability of said solid film from said article surface.

17. The method of claim 1 wherein said solvent is further defined as being able to partially dissolve said article surface.

18. The method of claim 1 wherein said solvent is further defined as being able to swell said article surface.

19. The method of claim 1 wherein said dye comprises from about two percent to about nine percent by weight of said ink.

20. The method of claim 1 wherein said film-forming substance comprises from about eleven percent to about forty-six percent by weight of said ink.

21. The method of claim 1 wherein said solid film has a thickness of greater than about two percent of a non-evaporated layer of said ink.

22. The method of claim 1 wherein said ink is further defined as comprising;

a. a solvent, b. a dye dispersed in said solvent to form a dye-solvent solution capable of penetrating an article surface, and C. a film-forming substance soluble in said dye-solvent solution and capable of holding said dye-solvent solution in contact with said article surface, and hardenable into a solid, flexible film upon evaporation of said solvent from said ink, said solid film being peelable from said article surface.

23. The method of claim 22 wherein said solvent consists at least in part of water.

24. The method of claim 23 wherein said film-forming substance is soluble in water.

25. The method of claim 24 wherein said film-forming substance consists at least in part of hydroxyethyl cellulose.

26. The method of claim 24 wherein said film-forming substance consists at least in part of polyvinyl alcohol.

27. The method of claim 22 wherein said solvent is a hydrocarbon.

28. The method of claim 27 wherein said film-forming substance is a polymer.

29. The method of claim 28 further including a release agent for moderating adherence between said article surface and said hardened film.

30. The method of claim 28 wherein said solvent is further defined as comprising about 45 percent of xylene and about 11 percent of n-butanol, relative to the total weight of said ink.

31. The method of claim 30 wherein said film-forming polymer is further defined as comprising about 22 percent of ethyl cellulose, relative to the total weight of said ink.

32. The method of claim 31 wherein said dye is further defined as comprising about 5.6 percent of the total weight of said ink.

33. The method of claim 32 wherein said dye is further defined as being an azo dye.

34. The method of claim 33 further including a release agent.

35. The method of claim 34 wherein said release agent is further defined as including about 11 percent mineral oil, relative to the total weight of said ink.

36. The method of claim 35 wherein said release agent is further defined as including about 5.5 percent castor oil, relative to the total weight of said ink.

37. The method of claim 1 wherein said ink is further defined as being a viscous, paste-like liquid comprising;

a. about 46 to 88 parts by weight of a solvent, b. about 2–10 parts by weight of a dye dispersable in said solvent to form a dye solvent solution capable of penetrating an article surface, and c. about 11 to 46 parts by weight of a film-forming polymer soluble in said dye-solvent solution and capable of holding said dye-solvent solution in contact with said article surface, and hardenable into a solid, flexible film upon evaporation of solvent from said ink, said solid film being peelable from said article surface.

38. The method of claim 37 wherein said solvent is selected from the group consisting of water, ethanol, n-butanol, methanol, propanol, isopropanol, iso-butanol, amyl alcohol, benzyl alcohol, hexane, cyclohexanone, methyl cyclohexanone, methyl ethyl ketone, methyl isobutyl ketone, acetone, benzene, chloroform, methylene chloride, carbon tetrachloride, ethylene dichloride, -butyl acetate, ethyl acetate, propyl acetate, isopropyl acetate, amyl acetate, methyl cellosolve acetate, cellosolve acetate, benzyl acetate, methyl formate, ethyl formate, ethyl lactate, butyl lactate, ethylene glycol, monoethyl ether, ethyl ether, methyl cellosolve, cellosolve, butyl cellosolve, toluene, xylene, tetralin, dioxane and pine oil.

39. The method of claim 37 wherein said dye is selected from the group consisting of azo, monoazo, trisazo, polyazo, diazo, disazo, azoic, stilbene, diphenylmethane, triarylmethane, acridine, azine, ketone imine, methane, nitro, nitroso, oxazine, thiazine, sulphur, lactone, indigoid, quinoline, methine, thiazole, indamine, xanthene, phthalocyanine, and anthraquinone.

40. The method of claim 37 wherein said dye is selected from the group consisting of acid, mordant, natural dyes, food, leather, direct, reactive, solvent, pigment, basic, spirit oil, vat and disperse dyes.

41. The method of claim 37 wherein said film-forming polymer is selected from the group consisting of natural resins, rubber derivatives, and cellulose derivatives; including cellulose esters such as cellulose nitrate, cellulose acetate, cellulose acetate-butyrate and cellulose propionate and cellulose ethers such as methyl cellulose, ethyl cellulose and carboxymethyl cellulose, varnishes, synthetic resins, alkyd resins and those resins formed by condensation polymerization such as phenolic resins, amino resins, polyesters, polyurethanes, polyamides, epoxides and polyethers; polyethylene, polypropylene, polyisobutylene, fluorocarbon polymers, polyvinyl acetate and its derivatives such as polyvinyl alcohol, vinyl polymers and copolymers, vinyl chloride polymers and copolymers, polyvinylidene chloride, polystyrene, acrylic polymers, coumarone-indene polymers, polyvinyl ethers, polyvinyl ketones, polyvinyl amines, fluorine-containing polymers and divinyl polymers; epoxy resins and synthetic rubbers and silicones and their derivatives.

42. The method of claim 37 further including a release agent for moderating adhesion of said solid film to said article surface.

43. The method of claim 42 wherein said release agent is selected from the group consisting of mineral oil, linseed oil, castor oil, silicone polymers, synthetic waxes, unsaturated fatty acid-monoamides, polyethylene glycol monostearate, fatty bisamides, and various plasticizers.

* * * * *